United States Patent [19]
Todd

[11] 3,863,958
[45] Feb. 4, 1975

[54] UNIVERSAL HOSE COUPLING
[76] Inventor: William H. Todd, P.O. Box 12488, Winston-Salem, N.C. 27107
[22] Filed: May 2, 1973
[21] Appl. No.: 356,409

[52] U.S. Cl. .............................................. 285/12
[51] Int. Cl. ............................................ F16l 25/00
[58] Field of Search ............................. 285/12, 241

[56] References Cited
UNITED STATES PATENTS
| | | | |
|---|---|---|---|
| 923,081 | 5/1909 | Sautter | 285/241 |
| 2,489,928 | 11/1949 | Phillips | 285/12 |
| 3,649,050 | 3/1972 | Woodling | 285/12 |

*Primary Examiner*—Patrick D. Lawson
*Attorney, Agent, or Firm*—Parrott, Bell, Seltzer, Park & Gibson

[57] ABSTRACT

A universal hose coupling which is adapted to be sealably connected to dissimilar externally threaded male fittings. The hose coupling includes a nipple having a tubular bore which includes a conical portion intermediate the ends thereof, and an entry end portion at the outer end thereof. The conical portion is adapted to sealably mate with a male "flare" fitting having a conically tapered forward end conforming to the taper of the conical portion, and the entry end portion is adapted to sealably engage the O-ring of a male "straight thread O-ring boss" fitting.

10 Claims, 4 Drawing Figures

PATENTED FEB 4 1975 3,863,958

UNIVERSAL HOSE COUPLING

The present invention relates to a hose coupling adapted to be fixedly connected to one end of a hydraulic hose or the like, and characterized by the ability to sealably receive dissimilar externally threaded male fittings.

In connecting hydraulic and pneumatic hoses to various external components such as valves, pumps, motors and the like, it is conventional practice to initially fixedly attach a hose coupling to one end of the hose. Normally, the fitting of the external component will not be designed to mate directly with the hose coupling, and it is common to attach an "adapter" to the hose coupling for the purpose of converting the fitting of the hose coupling to one which will properly mate with the fitting of the external component. Since there is a large number of standard hose coupling sizes (resulting from the large number of standard hose sizes), and since there is a large number of fitting designs which are used on the various external components, a large inventory of adapters must ordinarily be maintained by fabricators or users so that they may readily convert a hose coupling to a desired different fitting configuration.

Conventional hydraulic and pneumatic hose couplings are adapted to sealably mate only with a fitting of a single specific configuration, and fittings of a different design will not usually provide the desired sealing engagement. This lack of interchangeability aggravates the inventory problem since an entire set of adapters must be maintained which have the specific fitting which conforms to the hose coupling, and another complete set must be maintained for each of the other conventional fitting configurations which are employed with the various external components.

It is accordingly an object of the present invention to provide a hose coupling which is adapted to sealably receive dissimilar externally threaded male fittings so that the required inventory of adapters may be reduced.

It is another object of the present invention to provide a hose coupling which may be readily standardized for all hose sizes to further reduce the required inventory of adapters.

These and other objects and advantages of the present invention are achieved in the embodiment illustrated herein by the provision of a hose coupling which includes a nipple comprising a cylindrical stem portion and an integral head portion. A tubular bore extends coaxially through the stem portion and head portion and includes a conical portion intermediate the ends thereof to define a first outwardly facing sealing surface, and an entry end portion which defines a second outwardly facing sealing surface. A ferrule is positioned about the stem portion of the nipple to secure the end of the hose therebetween. The first sealing surface is adapted to sealably contact a correspondingly tapered forward end of a male fitting, and the second sealing surface is adapted to sealably engage an external O-ring carried by a dissimilar male fitting.

Some of the objects of the invention having been stated, other objects will appear as the description proceeds, when taken in connection with the accompanying drawings, in which FIG. 1 is an elevation view, partly sectioned, of a prior art hose coupling and mating adapter;

Figure 1:
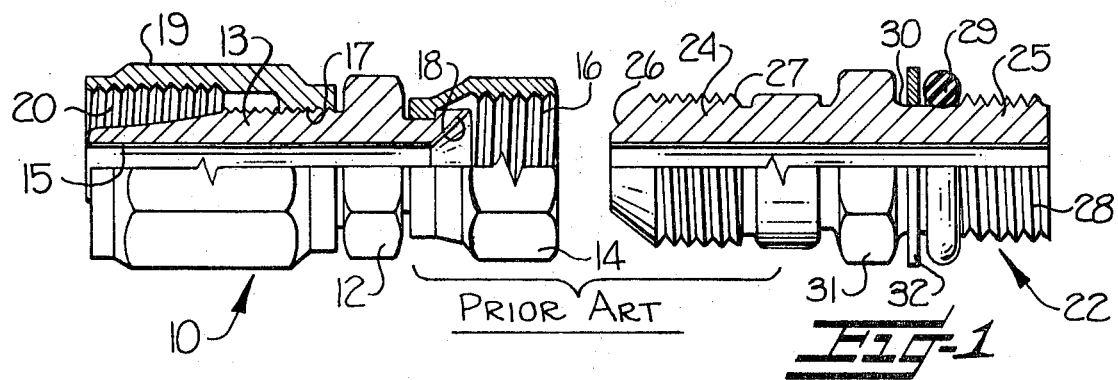

Referring more specifically to the drawings, a standard conventional hose coupling of a type well known in the art is indicated at 10 in FIG. 1. Generally, the hose coupling 10 is adapted to be fixedly connected to one end of a hydraulic or pneumatic hose, and it includes a nipple 12 comprising a cylindrical stem 13 and a "swivel" nut 14 carried at the front end of the stem. A tubular bore 15 extends through the stem and the nut 14 includes an internal thread 16. A portion of the peripheral surface of the stem 13 is threaded at 17, and the entry end of the bore 15 includes a frusto-conical surface 18. A ferrule 19 is threadedly connected to the threads 17 of the stem 13, and it further includes an internal threaded portion 20 for engaging and locking the end of a hose positioned in the annular orifice defined between the ferrule 19 and stem 13.

In order to convert the hose coupling 10 to a desired fitting configuration, it is common to employ an adapter having a fitting at one end designed to sealably engage the coupling, and a fitting at the other end of the desired different configuration. A typical and conventional adapter of this type is illustrated at 22 in FIG. 1. The adapter 22 includes what is known in the art as a "flare" fitting 24 at one end for sealably engaging the coupling 10, and a "straight thread O-ring boss" fitting 25 at the opposite end. The flare fitting 24 includes the conical forward end 26 which conforms to the conical surface 18 of the coupling 10 (generally either 37° or 45°). Also, the fitting 24 includes an external threaded portion 27 which conforms to the threads in the nut 14 so that the two conical surfaces 18 and 26 may be brought in to operative sealing contact by threading the fitting 24 into the nut 14.

The straight thread O-ring boss fitting 25 is commonly used in conjunction with various external components such as valves, pumps, and motors, but it is not designed to be sealably connected to the hose coupling 10. Generally, the fitting 25 includes a threaded end portion 28 which also conforms to the threads in the nut 14, and a resilient O-ring 29 positioned on the boss 30 which lies between the threaded portion 28 and the integral nut portion 31. The fitting 25 may also include a washer 32 positioned intermediate the O-ring 29 and the nut portion 31. As will be apparent, if the fitting 25 were to be threaded into the nut 14, the end of the fitting would engage the conical surface 18 prior to the O-ring 29 being contacted by the end of the nut 14, and in any event, any engagement between the end of the nut 14 and the O-ring 29 would not necessarily result in a sealed relationship.

In accordance with the present invention, a hose coupling is provided which is adapted to sealably receive either the flare fitting 24, or the straight thread O-ring boss fitting 25. Such interchangeability greatly increases the versatility of the coupling since the fabricator or user of such coupling will normally have on hand a large number of fittings of both types. For example, if the fabricator desires to convert from the hose coupling of the present invention to a male pipe fitting, he may employ either an adapter which converts from a flare fitting to a male pipe fitting, or an adapter which converts from a straight thread O-ring boss fitting to a male pipe fitting. This being the case, one of these duplicating adapters may be eliminated from his inventory.

Figure 2:
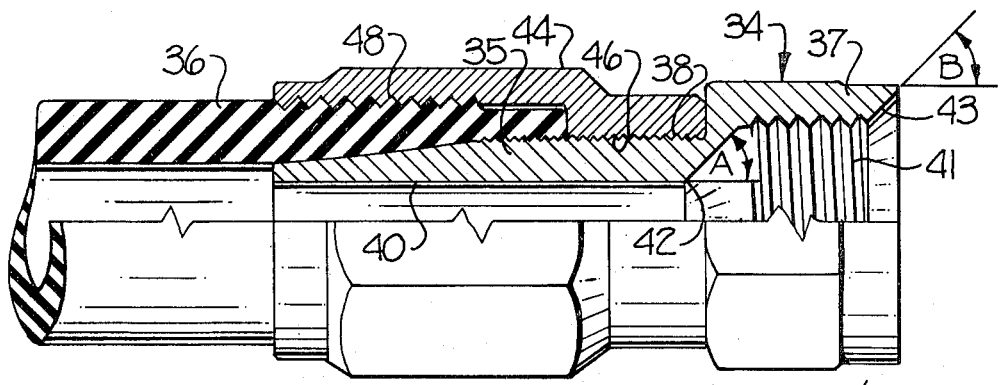
FIG. 2 is an elevation view, partly sectioned, of a hose coupling embodying the features of the present invention.

A hose coupling embodying the present invention is shown in FIG. 2 and comprises a nipple 34 which includes a cylindrical stem portion 35 which is adapted to be inserted into the end of the conventional hose 36, and an integral head portion 37. The outer periphery of the stem portion 35 is externally threaded along a portion of its length at 38, and the periphery of the head portion 37 defines a polygon i.e., hexagon as illustrated) in cross-section such that it may be engaged by a conventional wrench. A tubular bore extends coaxially through the stem portion 35 and head portion 37 and includes a first cylindrical bore portion 40 extending through the stem portion, and a second internally threaded portion 41 of a diameter larger than the first portion 40 and extending substantially through the head portion. A frusto-conical portion 42 interconnects the first bore portion 40 and second bore portion 41 to define a first outwardly facing sealing surface, and a frusto-conical entry end portion 43 communicates with the second bore portion 41 and defines a second outwardly facing sealing surface. Since the standard flare fitting has a conical forward end angled at either 37° or 45°, the angle A of the conical surface 42 will preferably conform to one of these standard valves. Also, the angle B of the conical entry end portion 43 will typically be about 45°.

As will be apparent from the drawings, the frustoconical portion 42 of the tubular bore has an axial depth equal to at least about one half the diameter of the bore portion 40 such that a relatively broad sealing surface is presented for engagement by the conical surface 26 of the flare fitting 24. Also, the frusto-conical entry end portion 43 has an axial depth and maximum diameter sufficient to permit the O-ring 29 of the fitting 25 to be substantially received therewithin.

A tubular ferrule 44 is positioned coaxially about the cylindrical stem portion 35, and the ferrule includes an internal passageway comprising a first internally threaded cylindrical portion 46 adapted to mate with the threads 38 of the stem portion 35, and a second internally threaded cylindrical portion 48. The second cylindrical portion 48 overlies in spaced relation the outer periphery of the stem portion 35 to define an annular orifice therebetween for receiving the end of the hose 36. As will be apparent, the internal threads at 48 are relatively deep-tapped to bite into and deform the cover of the hose 36 to thereby lock the hose in the annular orifice. The peripheral surface of the ferrule 44 also defines a polygon in cross-section such that both the ferrule 44 and head portion 35 are adapted to be engaged by a conventional wrench.

Figure 3:
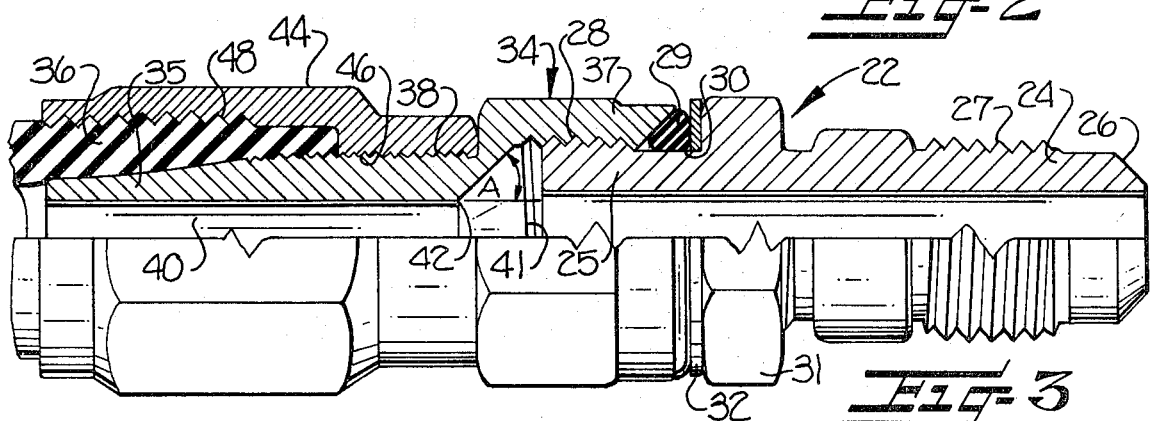
FIG. 3 is a view similar to FIG. 2 and showing the hose coupling sealably receiving the male fitting at one end of the adapter shown in FIG. 1.

FIG. 3 illustrates the hose coupling of the present invention sealably receiving the straight thread O-ring boss fitting 25 of the adapter 22. In particular, it will be seen that the conical entry end portion 43 of the nipple 34 is positioned to provide a relatively broad engagement surface with the O-ring 29, while compressing the same to effect the seal between the surface 43 and boss 30.

Figure 4:
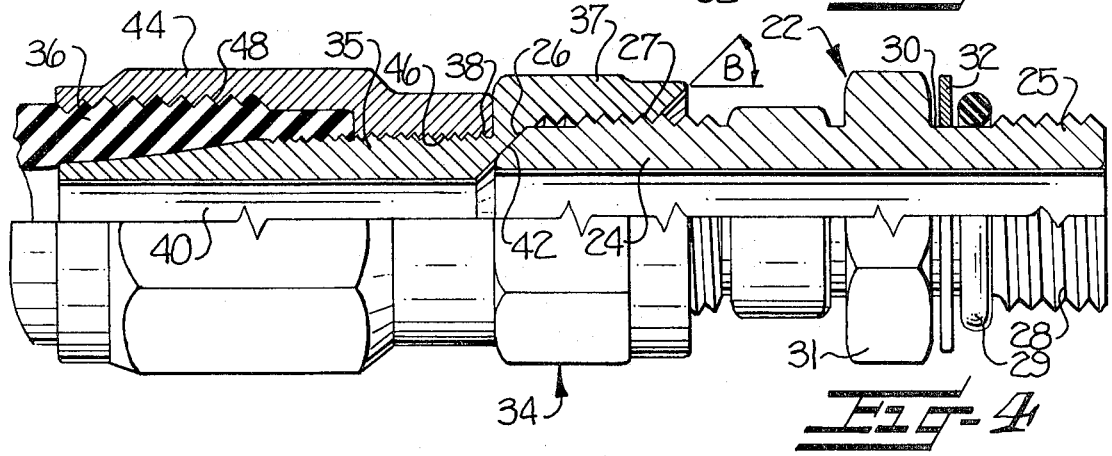
FIG. 4 is a view similar to FIG. 3 but showing the hose coupling sealably receiving the male fitting at the opposite end of the adapter shown in FIG. 1.

FIG. 4 shows the hose coupling of the present invention sealably receiving a flare fitting 24. In this case, the conical end surface 26 of the fitting 24 is in sealing contact with the relatively broad conical surface 42 of the nipple.

In the drawings and specification, there has been set forth a preferred embodiment of the invention, and although specific terms are employed, they are used in a generic and descriptive sense only and not for purposes of limitation.

That which is claimed is:

1. A hose coupling adapted to be fixedly connected to one end of a hydraulic hose or the like and characterized by the ability to sealably receive dissimilar externally threaded male fittings for connecting the coupling and associated hose to various external components, said hose coupling comprising a nipple comprising a cylindrical stem portion adapted to be inserted into the end of the hose, an integral head portion, and a tubular bore extending coaxially through said stem portion and said head portion, said tubular bore including a first portion extending substantially through said stem portion, a second internally threaded portion of a diameter larger than said first portion and extending substantially through said head portion, a frusto-conical portion interconnecting said first portion and said second portion to define a first outwardly facing sealing surface, and an entry end portion communicating with said second portion and defining a second outwardly facing sealing surface, and means for securing an end of the hose coaxially about said stem portion, whereby either an externally threaded male fitting having a conically tapered forward end conforming to the taper of said first sealing surface, or an externally threaded male fitting having an external O-ring which is adapted to sealably engage said second sealing surface, may be sealably received in said coupling.

2. The hose coupling as defined in claim 1 wherein said securing means comprises a tubular ferrule positioned coaxially about said cylindrical stem portion and defining an annular orifice between said stem portion and ferrule for receiving the end of the hose, means for connecting said ferrule to said stem portion, and means for locking the hose in said annular orifice.

3. The hose coupling as defined in claim 2 wherein said tubular ferrule includes an internal passageway comprising a first cylindrical portion, and a second cylindrical portion coaxial with and having a diameter greater than said first cylindrical portion, and said means for connecting said ferrule to said stem portion comprises a male thread positioned on said stem portion adjacent said head portion, and a female thread positioned on said first cylindrical portion of said ferrule and adapted to operatively engage said male thread.

4. The hose coupling as defined in claim 3 wherein said means for locking the hose in said annular orifice comprises a second female thread positioned on said second cylindrical portion of said internal passageway of said tubular ferrule, said second female thread being adapted to threadedly engage the end of the hose positioned in said annular orifice.

5. The hose coupling as defined in claim 4 wherein said ferrule further includes a peripheral surface defining a hexagon in cross section and which is adapted to be engaged by a conventional wrench.

6. The hose coupling as defined in claim 1 wherein said frusto-conical portion of said tubular bore is inclined at an angle of between about 37° and 45°.

7. The hose coupling as defined in claim 6 wherein said frusto-conical portion of said tubular bore has an axial depth equal to at least about one half the diameter of said first portion of said tubular bore such that the first sealing surface is relatively broad.

8. The hose coupling as defined in claim 7 wherein said second outwardly facing sealing surface is frusto-conical.

9. The hose coupling as defined in claim 8 wherein said second outwardly facing sealing surface has an axial depth and maximum diameter sufficient to permit an external O-ring on a mating male fitting to be substantially received therewithin.

10. The hose coupling as defined in claim 1 wherein said head portion of said nipple includes a peripheral surface defining a hexagon in cross section and which is adapted to be engaged by a conventional wrench.

* * * * *